(12) United States Patent
Fanton et al.

(10) Patent No.: US 10,589,877 B2
(45) Date of Patent: Mar. 17, 2020

(54) SYSTEM FOR MONITORING AN AIRCRAFT DEVICE

(71) Applicants: SAFRAN ELECTRONICS & DEFENSE, Boulogne Billancourt (FR); SAFRAN NACELLES, Gonfreville L'Orcher (FR)

(72) Inventors: Nicolas Fanton, Boulogne Billancourt (FR); Pierre-Jean Tine, Boulogne Billancourt (FR); Sébastien Nouchi, Gonfreville L'Orcher (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/309,340

(22) PCT Filed: Jun. 12, 2017

(86) PCT No.: PCT/EP2017/064318
§ 371 (c)(1),
(2) Date: Dec. 12, 2018

(87) PCT Pub. No.: WO2017/216119
PCT Pub. Date: Dec. 21, 2017

(65) Prior Publication Data
US 2019/0118978 A1      Apr. 25, 2019

(30) Foreign Application Priority Data
Jun. 13, 2016   (FR) ...................................... 16 55462

(51) Int. Cl.
*B64F 5/60*      (2017.01)
*B64D 29/00*    (2006.01)
(Continued)

(52) U.S. Cl.
CPC ................ *B64F 5/60* (2017.01); *B64D 29/00* (2013.01); *B64D 45/00* (2013.01); *G01H 1/006* (2013.01);
(Continued)

(58) Field of Classification Search
CPC ........... B64F 5/60; B64D 29/00; B64D 45/00; G01H 1/006; G01K 1/14; G07C 5/008;
(Continued)

(56) References Cited

U.S. PATENT DOCUMENTS

2013/0208111 A1*   8/2013   Kidd ...................... B64D 45/00
                                                              348/143
2015/0027226 A1*   1/2015   Turon ..................... H04Q 9/00
                                                              73/504.04

FOREIGN PATENT DOCUMENTS

WO    WO 2013/131072 A2    9/2013
WO    WO 2013/184894 A1    12/2013

* cited by examiner

*Primary Examiner* — Bao Long T Nguyen
(74) *Attorney, Agent, or Firm* — Muncy, Geissler, Olds & Lowe, P.C.

(57) ABSTRACT

A monitoring system for monitoring a piece of aircraft equipment, the system comprising a master electronic module and a slave electronic module, each fitted with first wireless communication means, the slave electronic module further comprising measurement means for the purpose of taking measurements of a parameter of the aircraft equipment, and power supply means making the slave electronic module independent in terms of energy, the master electronic module further comprising detector means adapted to detect a stage of flight in which the aircraft is to be found, and control means for acting via the first wireless communication means to control the measurement means of the
(Continued)

slave electronic module so as to adapt the measurements taken by the measurement means to the detected stage of flight.

13 Claims, 3 Drawing Sheets

(51) Int. Cl.
*B64D 45/00* (2006.01)
*H04B 7/185* (2006.01)
*H04Q 9/00* (2006.01)
*G01H 1/00* (2006.01)
*G01K 1/14* (2006.01)
*G07C 5/00* (2006.01)
*G07C 5/08* (2006.01)

(52) U.S. Cl.
CPC ............... *G01K 1/14* (2013.01); *G07C 5/008* (2013.01); *G07C 5/0808* (2013.01); *H04B 7/18506* (2013.01); *H04Q 9/00* (2013.01); *H04Q 2209/40* (2013.01); *H04Q 2209/823* (2013.01); *H04Q 2209/86* (2013.01); *H04Q 2209/883* (2013.01)

(58) Field of Classification Search
CPC .... G07C 5/0808; H04Q 9/00; H04Q 2009/40; H04Q 2209/823; H04Q 2209/86; H04Q 2209/883
USPC .................................. 701/32.7, 4, 14, 15, 16
See application file for complete search history.

SYSTEM FOR MONITORING AN AIRCRAFT DEVICE

The invention relates to the field of monitoring a piece of aircraft equipment (e.g. an engine nacelle).

BACKGROUND OF THE INVENTION

Numerous pieces of equipment in an aircraft are subjected to high levels of stress by their surroundings: temperature, pressure, vibration, impacts, electromagnetic disturbances, etc.

Most pieces of aircraft equipment are monitored permanently by sensors that measure parameters representative of the states of those pieces of equipment for the purposes firstly of detecting the occurrence of a fault or a failure, and secondly of detecting abnormal variations of a parameter in order to anticipate such a failure or such a fault.

Nevertheless, certain pieces of equipment, such as engine nacelles, for example, are not fitted with such sensors (or are only partially fitted therewith), since integrating such sensors raises a certain number of difficulties.

Unfortunately, engine nacelles are highly stressed during certain stages of flight. In particular, a nacelle is subjected to large variations in temperature and levels of vibration during stages of the aircraft taking off and climbing, and to large variations of pressure during stages of the aircraft descending, approaching, and landing. These temperatures, vibrations, and pressures stress the nacelle, accelerate its aging, and can lead to mechanical faults in the structure of the nacelle.

At present, such mechanical faults are detected by visual inspections during maintenance operations. Nevertheless, between visual inspections, one or more mechanical faults may appear or may become worse. The state of the nacelle then needs the nacelle either to be subjected to major repair or else to be replaced.

Naturally, proposals have been made to fit a nacelle with temperature, acceleration, and pressure sensors in order to detect and anticipate better the appearance of such mechanical faults, and in order to understand better the origin and the causes of such mechanical faults occurring. Nevertheless, integrating such sensors in the nacelle, and more particularly connecting them to the avionics network have been judged to be too complex to undertake.

OBJECT OF THE INVENTION

An object of the invention is to reduce the complexity of integrating a monitoring system in a piece of aircraft equipment, such as an engine nacelle.

SUMMARY OF THE INVENTION

In order to achieve this object, there is provided a monitoring system for monitoring a piece of aircraft equipment, the system comprising a master electronic module and a slave electronic module, each fitted with first wireless communication means for communicating with each other, the slave electronic module further comprising measurement means including a sensor for the purpose of taking measurements of a parameter of the aircraft equipment, and power supply means making the slave electronic module independent in terms of energy, the master electronic module further comprising detector means adapted to detect a stage of flight in which the aircraft is to be found, and control means for acting via the first wireless communication means to control the measurement means of the slave electronic module so as to adapt the measurements taken by the measurement means to the detected stage of flight.

The master electronic module and the slave electronic module communicate via the first wireless communication means. As a result, no wired connection for communication purposes connects together the master electronic module and the slave electronic module, thereby reducing the complexity of integrating the monitoring system of the invention on the equipment of the aircraft. The slave electronic module is controlled by the master electronic module via the first wireless communication means. The slave electronic module can thus be controlled without requiring the slave electronic module to be connected to the avionics network.

Likewise, the power supply means of the slave electronic module make the slave electronic module independent in terms of energy: there is therefore no need to connect the slave electronic module to the avionics network in order to power it.

Finally, it should be observed that adapting the measurements taken by the measurement means to the stage of flight serves in particular to reduce the frequency at which the sensor of the slave electronic module is sampled during the stage of flight in question and does not require measurements to be taken at high frequency, thereby serving to reduce the electricity consumption of the slave electronic module and thus to increase the duration of its independence.

The invention can be better understood in the light of the following description of a particular, non-limiting embodiment of the invention.

BRIEF DESCRIPTION OF THE DRAWINGS

Reference is made to the accompanying drawings, in which.

DETAILED DESCRIPTION OF THE INVENTION

Figure 1:
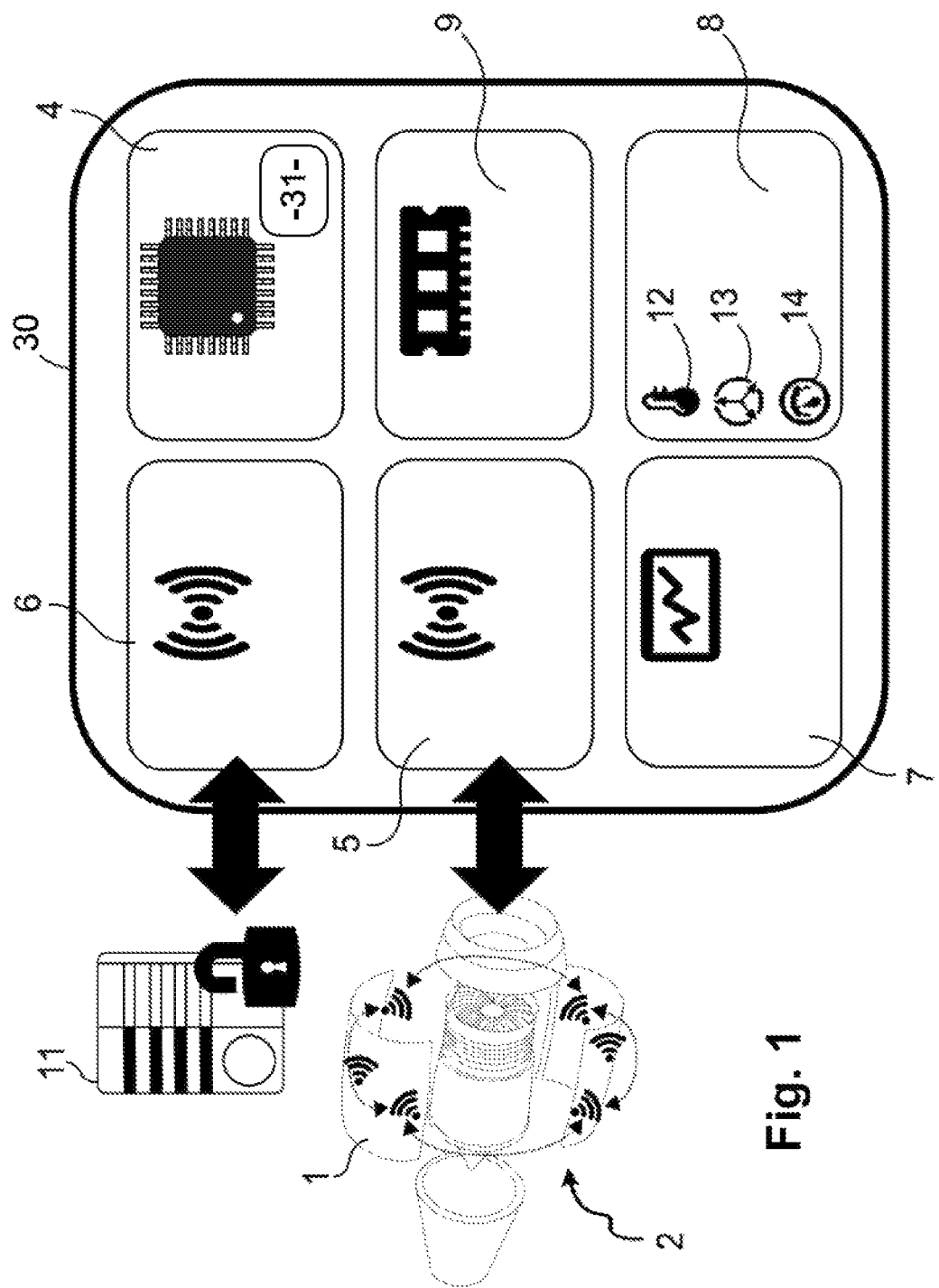
FIG. 1 shows a master electronic module of a monitoring system of the invention.
Figure 2:
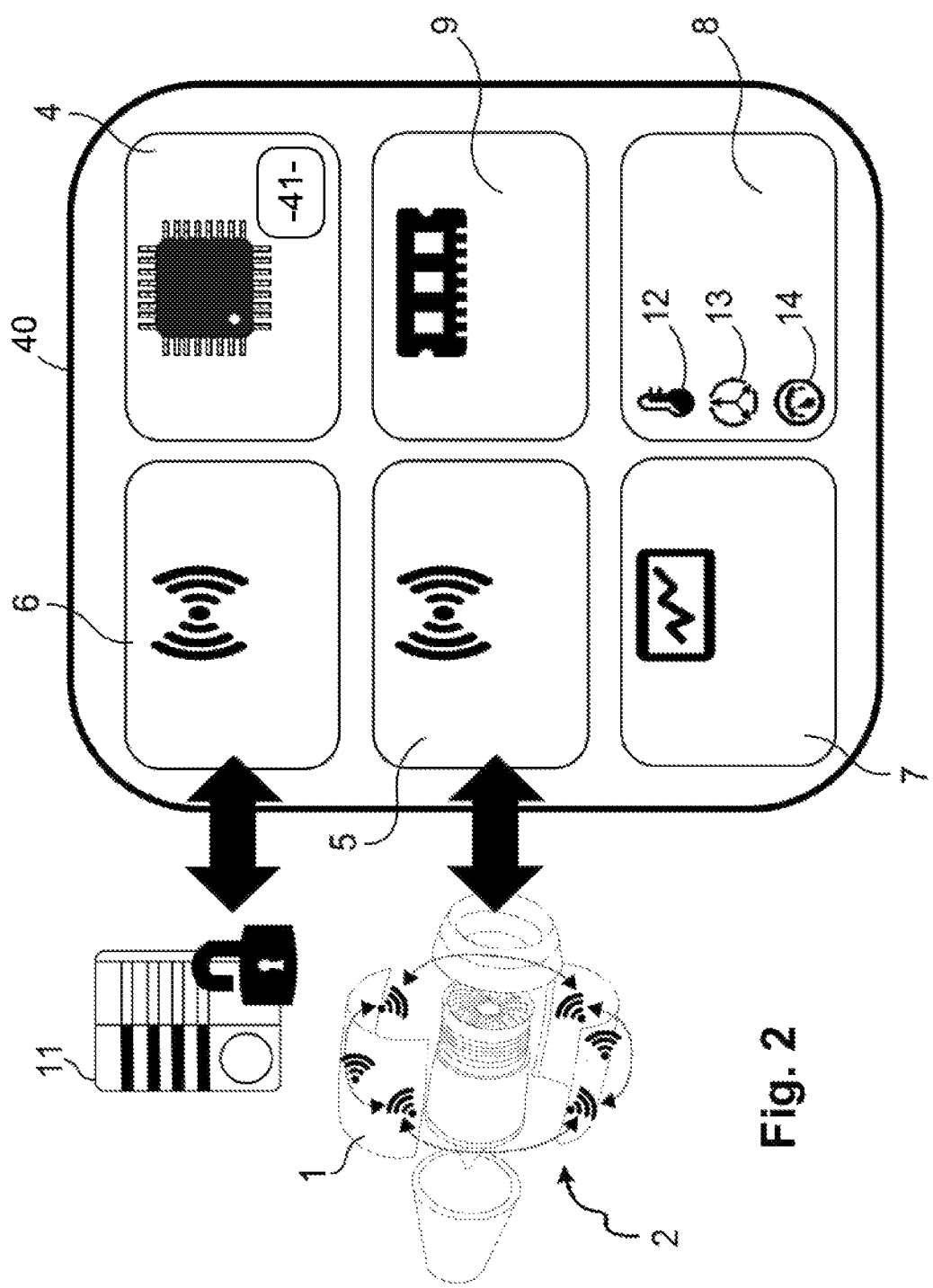
FIG. 2 shows a slave electronic module of the monitoring system of the invention.

With reference to FIG. 1 and FIG. 2, the monitoring system of the invention in this example is for monitoring a nacelle 1 of an aircraft engine 2.

The monitoring system of the invention includes electronic modules distributed over the structure of the nacelle 1. The electronic modules comprise a master electronic module 30 and a plurality of slave electronic modules 40.

In this example, each electronic module (master or slave) is identical from a hardware point of view, i.e. each electronic module, whether it is a master or a slave, has the same electric components. The master electronic module 30 and the slave electronic module 40 differ in the software programmed in a microcontroller 4 of the electronic module. Thus, the master electronic module 30 includes a microcontroller 4 having software 31 programmed therein to enable it to perform functions specific to a master electronic module, while each slave electronic module 40 includes a microcontroller 4 having software 41 programmed therein enabling it to perform functions specific to a slave electronic module.

In addition to the microcontroller 4, each electronic module includes first wireless communication means 5, second wireless communication means 6, a power supply module 7, measurement means 8, and a memory 9.

The first wireless communication means 5 comprise an antenna and a radio transceiver. The first wireless communication means 5 enable the master electronic module to communicate with each slave electronic module by radio communication. In this example, the first wireless communication means 5 make use of a proprietary communication protocol at a frequency and a power that are compatible with certification requirements. The frequency used in this example is 2.4 gigahertz (GHz).

The second wireless communication means 6 likewise comprise an antenna and a radio frequency transceiver. The second wireless communication means 6 in this example are used by the master electronic module only (and are therefore deactivated on the slave electronic module). The second wireless communication means 6 enable the master electronic module to transmit various pieces of data to a receiver terminal 11 on the ground that is situated outside the aircraft in an airport zone. The monitoring system of the invention co-operates with the ground receiver terminal 11 to form a low power wide area network (LPWAN) using technology designed for the Internet of things (IoT). In this example, the technology used is narrow band type technology or ultra-narrow band (UNB) type technology. The second wireless communication means 6 operate at a frequency compliant with local regulations. In this example, the frequency used is equal to 2.4 GHz. By using an LPWAN network, the second wireless communication means 6 present relatively low energy consumption and transmit relatively little radio energy. The communication data rate is also relatively low, but that is not a difficulty since there is no need for communication between the master electronic module and the ground receiver terminal 11 to be particularly fast.

The first wireless communication means 5 and the second wireless communication means 6 are compatible with all of the international standards relating to the use of radio frequencies.

The first wireless communication means 5 and the second wireless communication means 6 are designed to communicate while using only limited power so as to avoid disturbing other pieces of equipment of the aircraft and pieces of equipment on the ground. The first wireless communication means 5 and the second wireless communication means 6 are compatible in particular with the RTCA DO-160 standard, and in particular with its section 21, which deals with radio energy transmission.

The first wireless communication means 5 and the second wireless communication means 6 are also relatively insensitive to the various electromagnetic disturbances that are generated by equipment of the aircraft or that come from various sources of disturbance on the ground.

It should be observed that the first wireless communication means 5 and the second wireless communication means 6 (for the master electronic module) make the monitoring system of the invention totally independent in terms of communication. None of the (master or slave) electronic modules is connected to the avionics network. Furthermore, none of the (master or slave) electronic modules is connected by a wired connection to another electronic module (or to some other piece of equipment) in order to communicate with that other electronic module or that other piece of equipment.

The power supply module 7 includes energy storage means comprising energy harvesting means, a storage battery (other storage means such as a supercapacitor could also be used), and energy management means.

The energy harvesting means in this example transform the vibration generated by the engine 2 into electrical energy, which is used to power the electronic module and to charge the battery. Naturally, it would equally well be possible to transform some other source of energy into electrical energy, and in particular the heat produced by the engine 2 or an electromagnetic field produced by rotation of the engine 2.

The energy management means power the electronic module by using the electrical energy stored in the battery. The energy harvesting means are used to charge the battery. The energy management means adapt the power supply of the electronic module to the various modes of operation that are described below.

It should be observed that the power supply module 7 makes the (master or slave) electronic module completely independent in terms of energy. In particular, each electronic module is not connected by a wired connection to any external on-board source of energy.

The measurement means 8 comprise a temperature sensor 12, an acceleration sensor 13, and a pressure sensor 14. The temperature sensor 12 measures the temperature of the nacelle 1 (at the location where it is positioned), the acceleration sensor 13 measures the vibration to which the nacelle 1 is subjected, and the pressure sensor 14 measures the pressure to which the nacelle 1 is subjected.

The memory 9 of the electronic module is used to record and store a certain amount of data: measurements taken by the sensors, results of processing performed by the monitoring system of the invention, trigger thresholds, identification data, configuration parameters including configuration data of the nacelle 1, etc.

Figure 3:
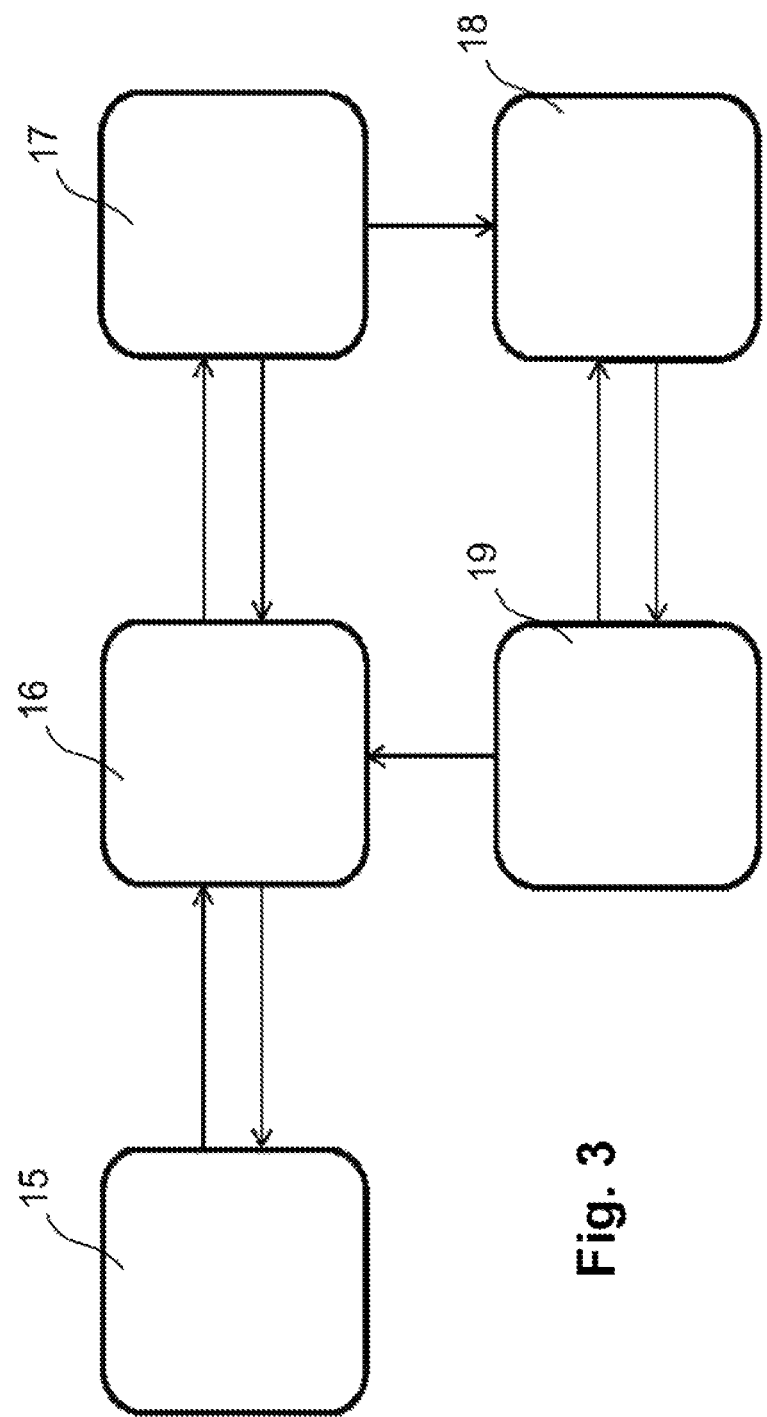
FIG. 3 is a diagram showing the operation of the monitoring system of the invention.

With reference to FIGS. 1,2 and 3, there follows a description in greater detail of the operation of the monitoring system of the invention.

The monitoring system of the invention operates in five operating modes: one non-operational operating mode 15 and four operational operating modes. The four operational operating modes comprise a "taxi" mode 16, a "takeoff and climb" mode 17, a "cruise" mode 18, and a "descent, approach, and landing" mode 19.

The non-operational mode of operation 15 is associated with a stage during which the aircraft is stopped on the ground with its engines off (for example the aircraft is parked in a hangar). The term "associated with a stage" is used to mean that the monitoring system of the invention operates in said mode whenever said stage is detected.

Each operational mode of operation is associated with one or more stages of flight of the aircraft during which that mode is implemented.

The taxi mode 16 is associated with a taxi-out stage (i.e. prior to takeoff) and with a taxi-in stage (i.e. a stage of taxiing after landing).

The takeoff and climb mode 17 is associated with a takeoff stage and with a climb stage.

The cruise mode 18 is associated with a cruise stage.

The descent, approach, and landing mode 19 is associated with a descent stage, an approach stage, and a landing stage.

When the monitoring system of the invention is in the non-operational mode of operation 15 (i.e. when the aircraft is stopped, on the ground, with its engines off), each slave electronic module is in a standby mode, in which the electrical energy consumption of the slave electronic module is almost zero.

The master electronic module is in a low energy consumption mode: only the microcontroller 4, the temperature sensor 12, and the acceleration sensor 13 of the master electronic module are active.

The non-operational mode of operation of the monitoring system of the invention is thus a low energy consumption mode.

When the aircraft engine 2 starts, the temperature of the nacelle 1 and the vibration to which the nacelle 1 is subjected increase. The temperature sensor 12 of the master electronic module and the acceleration sensor 13 of the master electronic module detect that the engine 2 of the aircraft has just been activated by measuring the temperature and the vibration to which the nacelle 1 is subjected. The temperature sensor 12 of the master electronic module and the acceleration sensor 13 of the master electronic module thus detect that the aircraft is about to be in a taxi-out stage.

The master electronic module then switches from the low energy consumption mode to a normal mode. The master electronic module controls the slave electronic module to cause the slave electronic modules to switch from the standby mode to a normal mode. The slave electronic modules are controlled via the microcontroller 4 of the master electronic module and via the first wireless communication means 5 of the master electronic module (which thus acts as control means), and via the first wireless communication means 5 of each of the slave electronic modules.

The master electronic module synchronizes the slave electronic modules on taxi mode 16 since the stage of flight following starting of the engine 2 is the taxi-out stage.

The temperature sensor 12 and the acceleration sensor 13 of the master electronic module thus acts as detector means adapted to detect the stage of flight in which the aircraft is to be found.

The master electronic module controls the measurement means 8 of the slave electronic modules (once more via the microcontroller 4 and the first wireless communication means 5 of the master electronic module acting as control means) to adapt the measurements taken by the measurement means 8 to the taxi-out stage. Specifically, the temperature sensor 12 and the acceleration sensor 13 in each slave electronic module are activated at a sampling frequency of one measurement per minute. The measurements taken by the temperature sensor 12 and the acceleration sensor 13 of each slave electronic module are transmitted via the first wireless communication means 5 to the master electronic module, which stores these measurements in its memory 9.

While the aircraft is taking off, the vibration to which the nacelle 1 is subjected increases. The acceleration sensor 13 of the master electronic module detects that the aircraft is in a take-off stage. The master electronic module synchronizes the slave electronic module on the takeoff and climb modes.

The acceleration sensor 13 of the master electronic module thus acts as detector means adapted to detect the stage of flight in which the aircraft is to be found.

The master electronic module controls the measurement means of the slave electronic module via the first wireless communication means 5 in order to adapt the measurements taken by the measurement means 8 to the takeoff and climb stages.

Specifically, the temperature sensor 12 and the acceleration sensor 13 in each slave electronic module are activated at a sampling frequency of three measurements per minute, and the pressure sensor 14 of each slave electronic module is activated at a sampling frequency of one measurement per minute.

The measurements taken by the temperature sensor 12, the acceleration sensor 13, and the pressure sensor 14 of each slave electronic module are transmitted via the first wireless communication means 5 to the master electronic module, which stores these measurements in its memory 9.

At the end of climbing, the altitude of the aircraft is high and atmospheric pressure is relatively low. The pressure sensor 14 of the master electronic module (which is likewise activated at a sampling frequency of one measurement per minute) detects the end of the climb stage and thus the beginning of the cruise stage.

The master electronic module synchronizes the slave electronic modules on the cruise mode.

The pressure sensor 13 of the master electronic module thus acts as detector means adapted to detecting the stage of flight in which the aircraft is to be found.

The master electronic module then controls the measurement means of the slave electronic module to adapt the measurements taken by the measurement means 8 to the cruise stage.

Specifically, the temperature sensor 12 and the acceleration sensor 13 of each slave electronic module are activated at a sampling frequency of one measurement per minute, and the pressure sensor 14 of each slave electronic module is activated at a sampling frequency of one measurement per minute. The sampling frequency of the temperature sensor 12 and the sampling frequency of the acceleration sensor 13 are low, since the cruise stage requires only little monitoring. The electrical energy consumption of the monitoring system of the invention is thus low.

The measurements taken by the temperature sensor 12, the acceleration sensor 13, and the pressure sensor 14 of each slave electronic module are transmitted via the first wireless communication means 5 to the master electronic module, which stores the measurements in its memory 9.

The end of the cruise stage marks the beginning of the descent stage. The descent stage is detected by the pressure sensor 14 of the master electronic module, which detects an increase in the pressure to which the nacelle 1 is subjected, and thus a decrease in the altitude of the aircraft.

The master electronic module synchronizes the slave electronic modules on the descent, approach, and landing modes.

The pressure sensor 14 of the master electronic module thus acts as detector means suitable for detecting the stage of flight in which the aircraft is to be found.

The master electronic module controls the measurement means 8 of the slave electronic module to adapt the measurements taken by the measurement means 8 to the cruise stage.

Specifically, the temperature sensor 12 and the acceleration sensor 13 of each slave electronic module are activated at a sampling frequency of three measurements per minute, and the pressure sensor 14 of each slave electronic module is activated at a sampling frequency of 1 kilohertz (kHz). The high sampling frequency of the pressure sensor 14 provides effective detection of events such as sudden changes of pressure that might damage the structure of the nacelle 1. Such events occur mainly during stages of descent, approach, and landing.

The measurements taken by the temperature sensor 12, the acceleration sensor 13, and the pressure sensor 14 of each slave electronic module are transmitted via the first wireless communication means 5 to the master electronic module, which stores these measurements in its memory 9.

At the end of flight, the pressure sensor 14 of the master electronic module detects that the nacelle 1 is no longer being subjected to vibration generated by the engine 2. The master electronic module controls the slave electronic modules so that they switch to standby mode. The monitoring system of the invention is thus once more in the non-operational mode of operation 15.

Once the flight has finished, the set of measurements stored in the memory 9 of the master electronic module and acquired during the various stages of flight are transmitted by the master electronic module to the ground receiver terminal 11 via the second wireless communication means 6 of the master electronic module. The master electronic module also transits other information stored in its memory 9 to the ground receiver terminal 11, specifically: results of measurements taken by the monitoring system of the invention; identification data; configuration parameters including configuration data for the nacelle 1; etc.

It should be observed that in order to optimize electricity consumption by the monitoring system of the invention, the second wireless communication means 6 of the master electronic module for communication with the ground receiver terminal 11 are activated only when the landing stage has been detected. During the other stages of flight of the airplane, communication with the ground is not authorized and the second wireless communication means 6 of the master electronic module are not powered.

Naturally, the invention is not limited to the embodiments described but covers any variant coming within the ambit of the invention as defined by the claims.

It is stated herein that the electronic modules, regardless of whether they are "master" or "slave" modules, are all identical from a hardware point of view. It is naturally possible to use master and slave electronic modules that are different from a hardware point of view, and even to use slave electronic modules that are mutually different from a hardware point of view.

By way of example, the slave electronic modules may comprise measurement means that differ depending on their positions on the equipment.

By way of example, provision may be made for the second wireless communication means not to be mounted in the slave electronic modules. Provision may also be made for only the slave electronic modules to be independent in terms of energy: the slave electronic modules then have respective storage batteries and advantageously energy harvesting means, while the master electronic module is connected to an on-board power source.

Provision may also be made for certain slave electronic modules to be dedicated to measuring temperature, and thus to include only a temperature sensor, while other slave electronic modules are dedicated to measuring vibration, and thus include only an acceleration sensor, while other slave electronic modules are dedicated to measuring pressure, and thus include only a pressure sensor. Under such circumstances, in a given mode of operation, the master electronic module activates only those slave electronic modules that are to take measurements during this given operational mode of operation.

The sensors mentioned may naturally be different: for example, a master or slave electronic module may be provided with a speed sensor, a sensor for sensing an electrical parameter (current, voltage, etc.), a force sensor, etc.

Although the present description relates to a particular architecture in which the nacelle is fitted with a master electronic sensor and a plurality of slave electronic sensors, it is possible to provide an architecture that is different. In particular, it is possible to have a plurality of master electronic modules for a single nacelle, or indeed a single master electronic module for a plurality of nacelles. The electronic modules (and in particular the master electronic module) are not necessarily positioned on the equipment being monitored.

The role of each master or slave electronic module in the monitoring system of the invention may also differ somewhat from that described. For example, it is possible to imagine that some of the slave electronic modules are used for relaying data coming from other slave electronic modules on its way to the master electronic module.

Although the second wireless communication means are described as using narrow-band or ultra-narrow-band type technology for the LPWAN network, it is entirely possible to use some other technology, e.g. technology of the LoRa or SigFox type. It is also possible to use a frequency other than the frequency of 2.4 GHz, and in particular a frequency that lies in the wireless avionics intra-communications (WAIC) band. By way of example, the frequencies of 868 megahertz (MHz), 915 MHz, or 4.2 GHz may be used. Likewise, the first wireless communication means may make use of frequencies other than the frequency of 2.4 GHz, and in particular the frequencies of 868 MHz, 915 MHz, or 4.2 GHz.

The sampling frequencies may also be different from the sampling frequencies mentioned in the description.

It is stated that the switch from the non-operational mode of operation to the taxi mode of the monitoring system of the invention is implemented by the master electronic module as a result of the (temperature, acceleration) sensors of the master electronic module detecting a rise in the temperature and the vibration to which the nacelle is subjected.

Alternatively, it is possible to make provision for the master electronic module to be in standby mode while the monitoring system of the invention is in the non-operational mode of operation, just like the slave electronic modules. The master electronic module is then "woken up" by the energy harvesting means picking up the vibration that results from starting the engine so as to produce electrical energy and thus a power supply voltage that powers the master electronic module.

Finally, the monitoring system of the invention can perfectly well be used for monitoring a piece of equipment in an aircraft other than a nacelle, e.g. a wing element or an undercarriage of the aircraft.

The invention claimed is:

1. A monitoring system for monitoring a piece of equipment of an aircraft, the monitoring system comprising a master electronic module and a slave electronic module, each fitted with first wireless communication means for communicating with each other, the slave electronic module further comprising measurement means including a sensor configured to take measurements of a parameter of the aircraft equipment, and power supply means making the slave electronic module independent in terms of energy, and the master electronic module further comprising detector means adapted to detect a stage of flight in which the aircraft is to be found, and control means for acting via the first wireless communication means of the master electronic module and via the first wireless communication means of the slave electronic module to control the measurement means of the slave electronic module so as to adapt the measurements taken by the measurement means to the detected stage of flight.

2. The monitoring system according to claim 1, wherein the measurement means of the slave electronic module and/or the detector means of the master electronic module comprise a temperature sensor and/or an acceleration sensor and/or a pressure sensor.

3. The monitoring system according to claim 1, wherein adapting these measurements consists in using another sensor in order to take measurements of another parameter and/or in modifying a sampling frequency of the sensor.

4. The monitoring system according to claim 1, the monitoring system being adapted to operate in a low energy consumption, non-operational mode of operation and in a normal mode of operation, as a function of the stage of flight that is detected.

5. The monitoring system according to claim 4, wherein the control means of the master electronic module are adapted to control the slave electronic module to switch from a standby mode to a normal mode so as to cause the monitoring system to switch from the non-operational mode of operation to the operational mode of operation.

6. The monitoring system according to claim 1, wherein the stage of flight that is detected is a stage from: a taxi-out stage; a takeoff stage; a climb stage; a cruise stage; a descent stage; an approach stage; a landing stage; and a taxi-in stage.

7. The monitoring system according to claim 6, wherein the detector means detect that an engine of the aircraft has just been started and thus that the aircraft is about to be in a taxi-out stage, by measuring the vibration or the temperature to which the aircraft equipment is being subjected.

8. The monitoring system according to claim 6, wherein the detector means detect that the aircraft is in the takeoff stage or in the landing stage by measuring vibration to which the aircraft equipment is being subjected.

9. The monitoring system according to claim 6, wherein the detector means detect that the aircraft is in a cruise stage by measuring a pressure to which the aircraft equipment is being subjected.

10. The monitoring system according to claim 1, wherein the power supply means of the slave electronic module include energy harvesting means.

11. The monitoring system according to claim 1, wherein the master electronic module includes second wireless communication means for transmitting the measurements to a receiver terminal on the ground.

12. The monitoring system according to claim 11, wherein the second wireless communication means are activated only after detecting a stage of landing.

13. An engine nacelle including a monitoring system according to claim 1.

* * * * *